July 28, 1931.  J. D. NORTH  1,816,544
COWLING FOR AIR COOLED INTERNAL COMBUSTION ENGINES
Filed Jan. 21, 1931   3 Sheets-Sheet 1
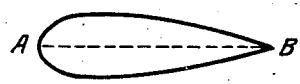
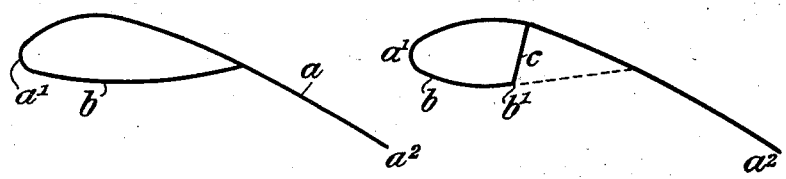
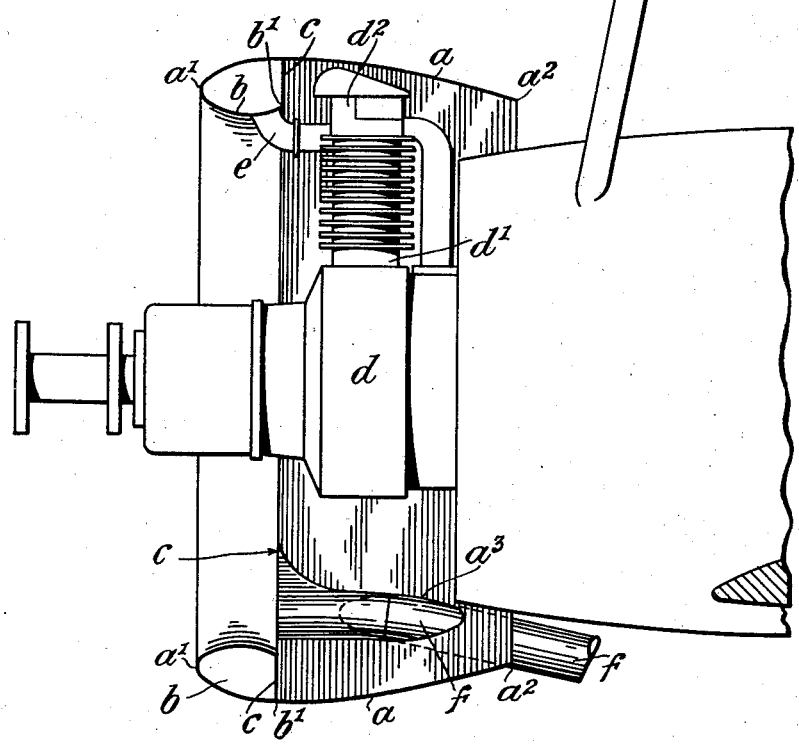

July 28, 1931. J. D. NORTH 1,816,544
COWLING FOR AIR COOLED INTERNAL COMBUSTION ENGINES
Filed Jan. 21, 1931   3 Sheets-Sheet 2

John Dudley North
Inventor

July 28, 1931.  J. D. NORTH  1,816,544
COWLING FOR AIR COOLED INTERNAL COMBUSTION ENGINES
Filed Jan. 21, 1931   3 Sheets-Sheet 3
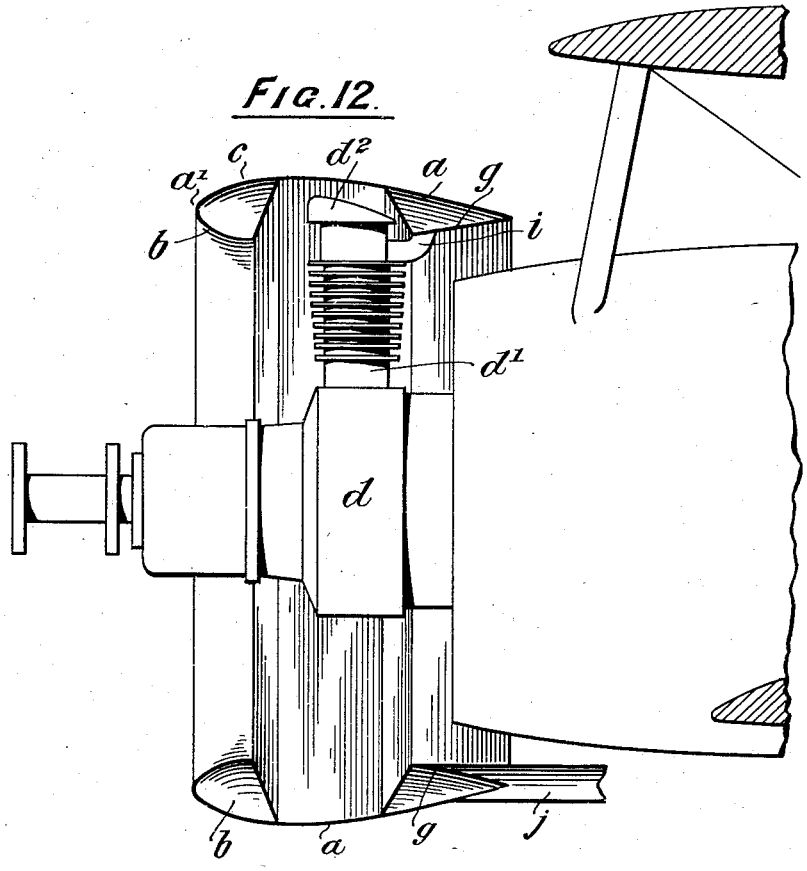

Patented July 28, 1931

1,816,544

UNITED STATES PATENT OFFICE

JOHN DUDLEY NORTH, OF NORWICH, ENGLAND, ASSIGNOR TO BOULTON & PAUL LIMITED, OF NORWICH, ENGLAND

COWLING FOR AIR-COOLED INTERNAL COMBUSTION ENGINES

Application filed January 21, 1931, Serial No. 510,313, and in Great Britain April 10, 1930.

This invention relates to cowlings for air-cooled engines of the type in which the cowling, in the form of a ring, is mounted around or in front of the engine. In air-cooled engines most efficient cooling of the engine is desired by reason of the air flowing round the engine and minimum resistance is also desired both in respect of the engine and of the cowling itself.

It is already known that the air resistance of an engine of the air-cooled radial type, when mounted in front of the body of an aeroplane or other aircraft, may be considerably reduced by mounting in front of the engine a cowling in the form of a ring which permits of the entrance of the air necessary for cooling the engine through a central orifice of the ring, which is appreciably smaller in diameter than the diameter of the engine. The air entering the ring after flowing past the engine cylinders, emerges from the after border of the ring where the interior diameter is approximately that of the outer contour of the engine.

Cowling rings of this type have been suggested, in which the material forming such ring is of uniform thickness, and it has also been proposed to make the ring of hollow form so that it may serve as a manifold for the collection of exhaust gases from the engine. It is also known that the resistance of the engine body combined with the fuselage may be still further reduced by the complete enclosing of the engine in a cowl in which the after end of the cowl extends behind the engine to a considerable extent.

According to this invention, we provide a cowling for air cooled internal combustion engines which is formed with an annular outer portion shaped to provide a streamline flow for air over its outer surface and with an annular inner portion shaped to provide a streamline flow for air over its inner surface, said annular inner portion terminating intermediate the ends of the said annular outer portion in an annular part which extends outwardly at an angle to the annular inner part and connects to the inner surface of the annular outer part.

The annular inner portion may be located either at the leading edge of the annular outer part so as to form a bulbous leading portion with the outwardly extending annular part at its after end or the annular inner portion may be located at the trailing edge of the annular outer portion with the outwardly extending annular part at its forward end. Further, two annular inner portions may be provided, one at the leading edge of the annular outer portion and the other at the trailing edge of the annular outer portion with the outwardly extending parts opposed to each other and spaced apart.

The length of the chord of the cowling from the forward edge to the after edge may be such as to enclose completely the engine within the cowling, or it may screen the engine in advance of the cylinders and terminate in a rearward direction around the cylinders, in the case of an engine of the radial type.

The invention will now be described with reference to the accompanying drawings illustrating practical embodiments thereof, in which:—

Figs. 1 to 4, illustrate diagrammatically the method of forming the cowling according to one practical embodiment of this invention.

Fig. 5 illustrates the application of the cowling to a radial engine mounted on aircraft, only one of the cylinders of the engine being shown in the drawings.

Figs. 9 and 10 are cross-sectional diagrams of modified forms of the cowling.

Fig. 11 is a cross-sectional diagram of a further modified form of the cowling.

Fig. 12 is a similar view to Fig. 5, illustrating the application of the cowling according to Fig. 11 to an aircraft engine.

Figure 6:
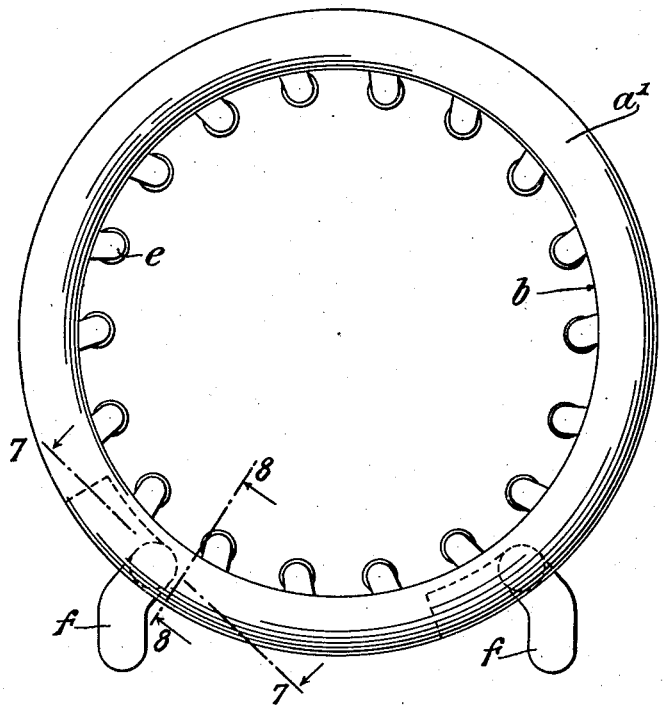
Fig. 6 is a front view of the cowling shown in Fig. 5, removed from the engine.
Figure 7:
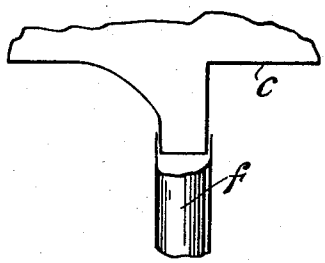
Fig. 7 is a sectional view on line 7—7 in Fig. 6 and looking in the direction of the arrows.
Figure 8:
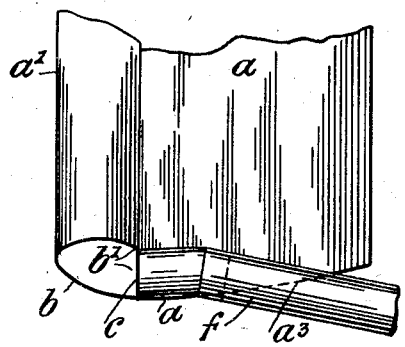
Fig. 8 is a sectional view on the line 8—8 in Fig. 6 and looking in the direction of the arrows.

As illustrated in Figs. 1 to 4, the shape or form of the bulbous portion is determined by designing in the first instance a streamline section of the required overall dimensions, as shown in Fig. 1, and thereafter so curving the centre line marked A—B to form a section as shown in Fig. 2. In this way a form or shape is obtained which provides a suitable cross-sectional shape or form for the leading edge of the cowling. This method of determining the form of the bulbous section is analogous to an already known method for determining the form of aircraft wing sections, and any of the known methods of computing the basic streamline shape as already known are used in the case of aircraft wing sections, may be employed for this purpose. It is the essence of these methods of computing shapes that give rise to a smooth and undisturbed airflow past them, that the rate of change of curvature of the surfaces past which the air flows should itself be subject to no abrupt variations, and any suitable method of ensuring that the contours comply with this requirement may be employed in laying out the form of such a bulbous section.

The cowling is constructed, as shown in Fig. 3, of a sheet of metal $a$ of annular form bent to provide a smooth curve in cross section such as would, for example, be used on the upper surface of an aircraft wing permitting smooth or streamline flow of air over the outer surface. This sheet of metal $a$ extends from the point $a^1$ representing the forward edge to the point $a^2$ representing the after edge and the length of the chord of this cowling from $a^1$ to $a^2$ is such that when the cowling is applied to an engine this engine is completely enclosed within the cowling, as shown in Fig. 5. To this outer member $a$ is applied a leading portion which forms with the outer member $a$ a bulbous shape corresponding to that shown in Fig. 2. This leading portion of the bulbous shape is formed by providing a sheet metal inner portion $b$ which trails off to the outer portion $a$.

As shown in Fig. 4, however, this inner portion trails off to a point marked $b^1$ at about one-fourth of the chord of the outer member at which it extends outwardly at an angle to the part $b$ forming a rear annular ring $c$ at the bulbous portion which extends outwardly to the outer portion $a$ to which it is attached.

This foreshortening of the bulbous portion of the cowling results in a departure of the inner surface of the cowling from the smooth curvature obtained with the construction shown in Fig. 3. Provided that this departure acts at a reasonable distance back from the leading edge we have found that the departure may take the form of an abrupt step without detrimental effects.

In its application to aircraft engines $d$ with radial cylinder $d^1$ this cowling is applied as shown in Fig. 5 with the bulbous portion in front of the cylinders $d^1$; with the outer portion $a$ extending over the ends of the cylinders; with the after end $a^2$ behind the engine and with the cylinder heads $d^2$ close to the internal surface of the outer portion.

The bulbous portion may conveniently be used as a collector and silencer for the exhaust gases from the engine $d$, the gases entering the ring through a series of pipes $e$, which pipes are fixed at one end to the exhaust ports of the cylinders $d^1$ of the engine $d$ and curved forwardly and outwardly and pass into the inner portion $b$ of the bulbous portion adjacent the point $b^1$ thereof. As shown in Fig. 6 these exhaust pipes are located at intervals around the interior of the cowling. The exhaust gases leave the bulbous portion by means of two outlet pipes $f$, which pipes are fixed at their forward end to the outwardly extending ring $c$ and extend outwardly and rearwardly through holes $a^3$ in the outer portion $a$. These outlet pipes are located at the lower end of the cowling and are spaced apart one on either side thereof.

Shortly stated, the cowling constructed in accordance with this embodiment of the invention consists of a bulbous portion and an annular continuation of relatively thin metal with a step between the bulbous portion and the continuation on the interior of the cowling.

Fig. 9 illustrates diagrammatically an arrangement in which the annular space is formed at the trailing portion. In this case the cowling is constructed with the outer portion $a$ in accordance with the previous embodiment, and to this outer portion is applied an inner portion $g$ extending forwardly from the trailing end $a^2$ to a point $g^2$ intermediate the ends of the outer portion. The inner portion is constructed to a curved shape so as to provide for a smooth flow of air over its surface. At the forward end of the inner portion is located an outwardly extending annular part $h$ which is constructed at an angle to the inner portion and is connected at its outer periphery to the inner surface of the outer annular portion $a$. The angle which the outwardly extending part subtends to the inner portion may be increased, for instance, as indicated by the dotted lines in Fig. 9. In this arrangement the leading portion of the cowling will be of uniform thickness terminating at the leading edge $a^1$.

Fig. 10 is a similar view to Fig. 9 but formed with an outwardly extending part $h^1$ constructed of a curved shape.

Fig. 11 shows a further modification in which the embodiments shown in Figs. 4 and 9 are combined. In this view parts corresponding to those in Figs. 4 and 9 are indicated by like reference numerals to those used in these figures. In this case the annular inner portion $g$ constitutes a continuation of the streamline of the inner portion b of the bulbous leading portion. The cowling so made presents a complete streamline section except for a portion midway between its leading and trailing edges. The outwardly extending annular part at the fore end of the annular space at the trailing edge as well as the outwardly extending annular part at the after end of the bulbous leading portion may be curved inwardly or outwardly as indicated by the dotted lines.

Fig. 12 shows the application of the cowling constructed as shown in Fig. 11 to an aircraft engine with the exhaust ports facing to the rear. The exhaust ports of the engine are connected by the rearwardly and outwardly extending pipes, only one of which marked *i* is shown adapted to connect to the inner portion *g* at the after portion of the cowling. The annular space so formed at the trailing edge is thus used as a collector and silencer for the exhaust gases from the engine, gases entering this space through the pipes fixed to the exhaust ports and to the inner portion *g* and leaving the annular space at the trailing edge by means of outlet pipes *j* fixed at their forward ends to the inner portion *g* and the outer portion *a* and extending rearwardly thereof.

What I claim as my invention and desire to secure by Letters Patent is:—

1. A cowling for air-cooled internal combustion engines formed with an annular outer portion shaped to provide a streamline flow for air over its upper surface, an annular inner portion shaped to provide a streamline flow for air over its inner surface, said annular inner portion terminating between the ends of said annular outer portion, and an outwardly extending annular part located at an angle to the annular inner portion and connected to the inner surface of the annular outer portion.

2. A cowling for air-cooled internal combustion engines formed with an annular outer portion shaped to provide a streamline flow for air over its upper surface from a leading to a trailing edge, an annular inner portion located at the leading edge of the annular outer portion and shaped to provide a bulbous leading portion with a streamline flow for air over its inner surface, and an outwardly extending annular part at the after end of said bulbous leading portion which outwardly extending annular part is set at an angle to the annular inner portion and is connected to the inner surface of the annular outer portion.

3. A cowling for air-cooled internal combustion engines formed with an annular outer portion shaped to provide a streamline flow for air over its upper surface, an annular inner portion located at the trailing edge of the annular outer portion and shaped to provide a streamline flow for air over its inner surface, and an outwardly extending annular part at the forward end of said annular inner portion which outwardly extending annular part is at an angle to the annular inner portion and is connected to the inner surface of the annular outer portion.

4. A cowling for air-cooled internal combustion engines formed with an annular outer portion shaped to provide a streamline flow for air over its upper surface from a leading edge to a trailing edge, an annular inner portion at the leading edge of said annular outer portion shaped to provide a bulbous leading portion with a streamline flow for air over its inner surface, an outwardly extending annular part at the after end of said bulbous leading portion which outwardly extending annular part is set at an angle to the annular inner portion, an annular inner trailing portion located at the trailing edge of the annular outer portion and shaped to provide a streamline flow for air over its inner surface, and an outwardly extending annular part at the forward end of said annular inner trailing portion set at an angle to the annular inner trailing portion and connected to the inner surface of the annular outer portion.

5. A cowling for air-cooled internal combustion engines formed with an annular outer portion shaped to provide a streamline flow for air over its upper surface, from a leading edge to a trailing edge, an annular inner portion shaped to provide a streamline flow for air over its inner surface, said annular inner portion terminating intermediate the edges of said annular outer portions, an outwardly extending annular portion set at an angle to the annular inner portion and connected to the inner surface of the annular outer portion, pipes for connecting said cowling to exhaust ports on the internal combustion engine adapted to pass exhaust gases to said cowling, and an outlet pipe on said cowling adapted to allow said exhaust gases to leave said cowling.

6. A cowling for air-cooled internal combustion engines formed with an annular outer portion shaped to provide a streamline flow for air over its upper surface from a leading edge to a trailing edge, an annular inner portion located at the leading edge of the annular outer part and shaped to provide a hollow bulbous leading portion with a streamline flow for air over its inner surface, an outwardly extending annular part at the after end of said bulbous leading portion which outwardly extending annular part is set at an angle to the annular inner portion and is connected to the inner surface of the annular outer portion, pipes for connecting the hollow bulbous leading portion to exhaust ports on the internal combustion engine adapted to pass the exhaust gases to said bulbous leading portion and outlet pipes on the outwardly extending annular part adapted to allow the exhaust gases to leave said bulbous leading portion.

7. A cowling for air-cooled internal combustion engines formed with an annular outer portion shaped to provide a streamline flow for air over its upper surface, an annular inner portion located at the trailing edge of the annular outer portion and shaped to provide a hollow trailing portion with a streamline flow for air over its inner surface, an outwardly extending annular part at the forward end of said annular inner portion which outwardly extending annular part is set at an angle to the annular inner portion and is connected to the inner surface of the annular outer portion, pipes for connecting the hollow trailing portion to exhaust ports on the internal combustion engine adapted to pass exhaust gases to said hollow trailing portion and outlet pipes adapted to allow said exhaust gases to leave the hollow trailing portion.

8. A cowling for air-cooled internal combustion engines formed with an annular outer portion shaped to provide a streamline flow for air over its upper surface from a leading edge to a trailing edge, an annular inner portion shaped to provide a streamline flow for air over its inner surface, said annular inner portion terminating between the edges of said outer portion, and an outwardly extending annular part curved in cross-section set at an angle to the annular inner portion and connected at its outer periphery to the inner surface of the annular outer portion.

In witness whereof I have hereunto set my hand.

JOHN DUDLEY NORTH.